(12) United States Patent
Tomizawa

(10) Patent No.: US 11,325,647 B2
(45) Date of Patent: May 10, 2022

(54) UNDERBODY STRUCTURE OF VEHICLE

(71) Applicant: Toyota Jidosha Kabushiki Kaisha, Toyota (JP)

(72) Inventor: Yoshihito Tomizawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 158 days.

(21) Appl. No.: 16/672,853

(22) Filed: Nov. 4, 2019

(65) Prior Publication Data

US 2020/0148266 A1 May 14, 2020

(30) Foreign Application Priority Data

Nov. 8, 2018 (JP) .............................. JP2018-210339

(51) Int. Cl.
| *B62D 21/03* | (2006.01) |
|---|---|
| *B62D 21/09* | (2006.01) |
| *B62D 25/20* | (2006.01) |

(52) U.S. Cl.
CPC ............. *B62D 21/03* (2013.01); *B62D 21/09* (2013.01); *B62D 25/2009* (2013.01)

(58) Field of Classification Search
CPC ........ B62D 21/02; B62D 21/03; B62D 21/09; B62D 21/157; B62D 25/20; B62D 25/2009; B62D 25/2036
See application file for complete search history.

(56) References Cited

U.S. PATENT DOCUMENTS

| 2002/0195840 | A1* | 12/2002 | Mishima | ............ | B62D 25/2045 296/203.01 |
|---|---|---|---|---|---|
| 2003/0102696 | A1 | 6/2003 | Matsuoka | | |
| 2005/0082879 | A1* | 4/2005 | Goto | .................. | B62D 25/2036 296/204 |
| 2016/0207568 | A1* | 7/2016 | Natsume | ................ | B62D 21/06 |
| 2016/0332686 | A1* | 11/2016 | Kowalski | ........... | B62D 25/2045 |
| 2017/0036629 | A1* | 2/2017 | Ishizaki | ............. | B62D 25/2036 |
| 2017/0210426 | A1* | 7/2017 | Gao | ..................... | B62D 29/008 |
| 2018/0065686 | A1* | 3/2018 | Maier | ................. | B62D 27/026 |
| 2019/0009833 | A1* | 1/2019 | Yamagishi | ............. | B62D 27/02 |
| 2019/0233015 | A1* | 8/2019 | Kasai | .................... | B62D 21/08 |
| 2020/0031399 | A1* | 1/2020 | Matsuda | .................. | B60K 1/04 |
| 2020/0148266 | A1* | 5/2020 | Tomizawa | ............. | B62D 25/20 |
| 2020/0148276 | A1* | 5/2020 | Tomizawa | ............. | B62D 27/06 |
| 2020/0180698 | A1* | 6/2020 | Lee | ........................ | B62D 25/20 |
| 2020/0361534 | A1* | 11/2020 | Matsuda | ............... | B62D 25/145 |
| 2020/0361535 | A1* | 11/2020 | Matsuda | ............... | B62D 21/04 |
| 2020/0361541 | A1* | 11/2020 | Matsuda | ............... | B62D 27/023 |

(Continued)

FOREIGN PATENT DOCUMENTS

| JP | 5-270444 A | 10/1993 |
|---|---|---|
| JP | 8-119151 A | 5/1996 |

(Continued)

*Primary Examiner* — Gregory A Blankenship
(74) *Attorney, Agent, or Firm* — Dinsmore & Shohl LLP

(57) ABSTRACT

A floor center member extends through a central part of a body floor of a vehicle and along a longitudinal direction of the vehicle, and a first floor cross member penetrates the floor center member to extend in a lateral direction of the vehicle. A reinforcing member extending in the longitudinal direction of the vehicle is disposed on the interior of the floor center member and above the first floor cross member.

5 Claims, 3 Drawing Sheets

(56) References Cited

U.S. PATENT DOCUMENTS

2020/0361542 A1* 11/2020 Matsuda ............ B62D 25/2036
2021/0101490 A1*  4/2021 Yang ................... B62D 25/20

FOREIGN PATENT DOCUMENTS

| JP | 11-255145 A  |  9/1999 |
| JP | 2002-331968 A | 11/2002 |
| JP | 2002-362419 A | 12/2002 |
| JP | 2003-137137 A |  5/2003 |
| JP | 2004-314729 A | 11/2004 |
| JP | 2004-338581 A | 12/2004 |
| JP | 2007-320341 A | 12/2007 |
| JP | 2018-030513 A |  3/2018 |

* cited by examiner

UNDERBODY STRUCTURE OF VEHICLE

CROSS REFERENCE TO RELATED APPLICATION

This application claims priority to Japanese Patent Application No. 2018-210339 filed on Nov. 8, 2018, which is incorporated herein by reference in its entirety including the specification, claims, drawings, and abstract.

TECHNICAL FIELD

The present disclosure relates to an underbody structure of a vehicle and particularly relates to coupling of skeletal members arranged on a body floor and crossing each other.

BACKGROUND

In an underbody structure of a vehicle, skeletal members are arranged on a body floor making up the floor of a cabin. The skeletal members include, for example, a floor center member extending through a central part of the body floor and along, the longitudinal direction of the vehicle, and a floor cross member extending in the lateral direction of the vehicle to cross the floor center member.

JP 2018-30513 A describes a floor center member (center tunnel) (9) extending through a central part of a floor panel (3) and along the longitudinal direction of a vehicle a first cross member (19) penetrating the floor center member (9) to extend in the lateral direction of the vehicle, and a second cross member (31) located rearward relative to the first cross member (19) and extending in the lateral direction of the vehicle. These members are described as skeletal members of an underbody structure of the vehicle. The above member names and signs in parentheses are member names and sign used in JP 2018-30513 A, and are not related to member names and signs used in the description of an embodiment of the present disclosure.

In a structure in which a floor cross member penetrates a floor center member, the floor center member has a part that is supported by the floor cross member against a collision load created by a frontal collision, and a part that is not supported by the floor cross member against the same. When subjected to a collision load, these two parts deform. If the two parts widely differ in the extent of deformation, the collision load cannot be absorbed sufficiently, in which case the floor may deform significantly.

The present disclosure is applied to effectively suppress deformation of a part where skeletal members of an underbody structure of a vehicle cross each other.

SUMMARY

An underbody structure of a vehicle according to the present disclosure includes a floor center member disposed on a body floor of the vehicle, the floor center member extending through a central part of the body floor and along a longitudinal direction of the vehicle; a first floor cross member disposed on the body floor of the vehicle, the first floor cross member penetrating the floor center member to extend in a lateral direction of the vehicle; and a reinforcing member located above the first floor cross member, the reinforcing member extending in the longitudinal direction of the vehicle. The reinforcing member is joined to an inner wall surface or an outer wall surface on the top of the floor center member.

A part of the floor center member that becomes weak because of penetration by the first floor cross member can be reinforced with the reinforcing member.

The reinforcing member may be joined to two walls that form a ridge line on the top of the floor center member, the ridge line extending in the longitudinal direction of the vehicle. The reinforcing member reinforces a part formed into the ridge line.

The reinforcing member, in combination with the two walls forming the ridge line, may form a closed sectional structure. Formation of the closed sectional structure reinforces the surrounding part of the ridge line.

On the top face of the floor center member, a ridge may be formed along a left marginal part and along a right marginal part and the reinforcing member may be located on the interior of the ridge. Formation of the ridge provides more ridge lines, thus enhancing the strength of the top of the floor center member.

The underbody structure of the vehicle may further include a second floor cross member disposed on the floor of the vehicle, the second floor cross member extending in the lateral direction of the vehicle and being located rearward relative to the first floor cross member. A rear end of the floor center member may be coupled to the second floor cross member. A collision load created by a frontal collision can be transmitted to the second floor cross member.

DESCRIPTION OF EMBODIMENT

An embodiment of the present disclosure will hereinafter be described with reference to drawings. In the following description, unless specified otherwise, phrases expressing relative positional relationships and directions, such as front, front side, rear, rear side, left, right, side, above, upper side, below, and lower side, define positional relationships and directions pertaining to a vehicle. The front-to-rear direction of the vehicle is defined as the longitudinal direction, the left-to-right direction of the same as the lateral direction, and the top-to-bottom direction of the same as the vertical direction. In each drawing, an arrow FR points the front side, an arrow UP points the upper side, and an arrow LH points the left side.

Figure 1:
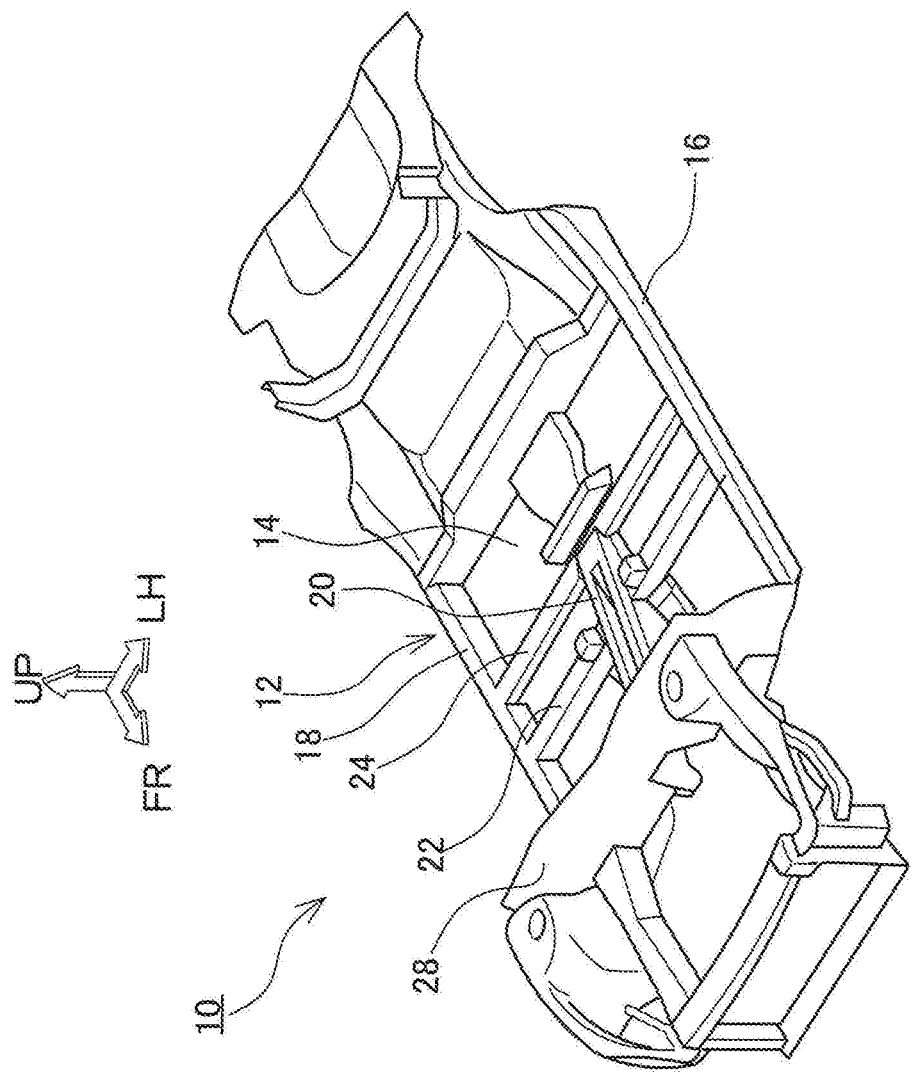
FIG. 1 is a perspective view of a schematic configuration of an underbody structure of a vehicle.

FIG. 1 is a perspective view of a schematic configuration of an underbody structure 10 of a vehicle. The underbody structure 10 includes a body floor 12 making up the floor of the cabin of the vehicle. The body floor 12 is formed basically by joining press-worked sheet metals together, by welding or the like. The body floor 12 has a floor panel 14 making up the bottom of the body floor 12, and floor skeletal members that are arranged on the floor panel 14 and that extend in the longitudinal direction or lateral direction of the vehicle. The floor skeletal members include rockers 16 and 18 extending in the longitudinal direction along left and right side edges of the body floor 12, a floor center member 20 extending in the longitudinal direction at a central part of the body floor 12, and floor cross members 22 and 24 extending in the lateral direction to connect the rocker 16 to the rocker 18. Two floor cross members 22 and 24 include one floor cross mem her located frontward, which is referred to as the first floor cross member 22, and the other located rearward, which is referred to as the second floor cross member 24. Each of the first and second floor cross members 22 and 24 has a section of an inverted U shape. When joined to the floor panel 14, therefore, each of the first and second floor cross members 22 and 24, in combination with the floor panel 14, forms a closed section of a polygonal shape, such as a rectangular closed section.

The floor center member 20 is formed in such a way as to rise from the floor panel 14. The floor center member 20 has left and right side walls 20b and a top wall 20a connecting the upper parts of the side walls 20b, and has a section of an inverted U shape. The floor center member 20 extends rearward from a dash panel 28 to reach the second floor cross member 24, and has a top face sloped down toward the rear side. The floor center member 20 crosses the first floor cross member 22 such that the first floor cross member 22 penetrates the floor center member 20. A lower part of the floor center member 20 is cut out by the first floor cross member 22, while an upper part of the same extends rearward across the first floor cross member 22.

Figure 2:
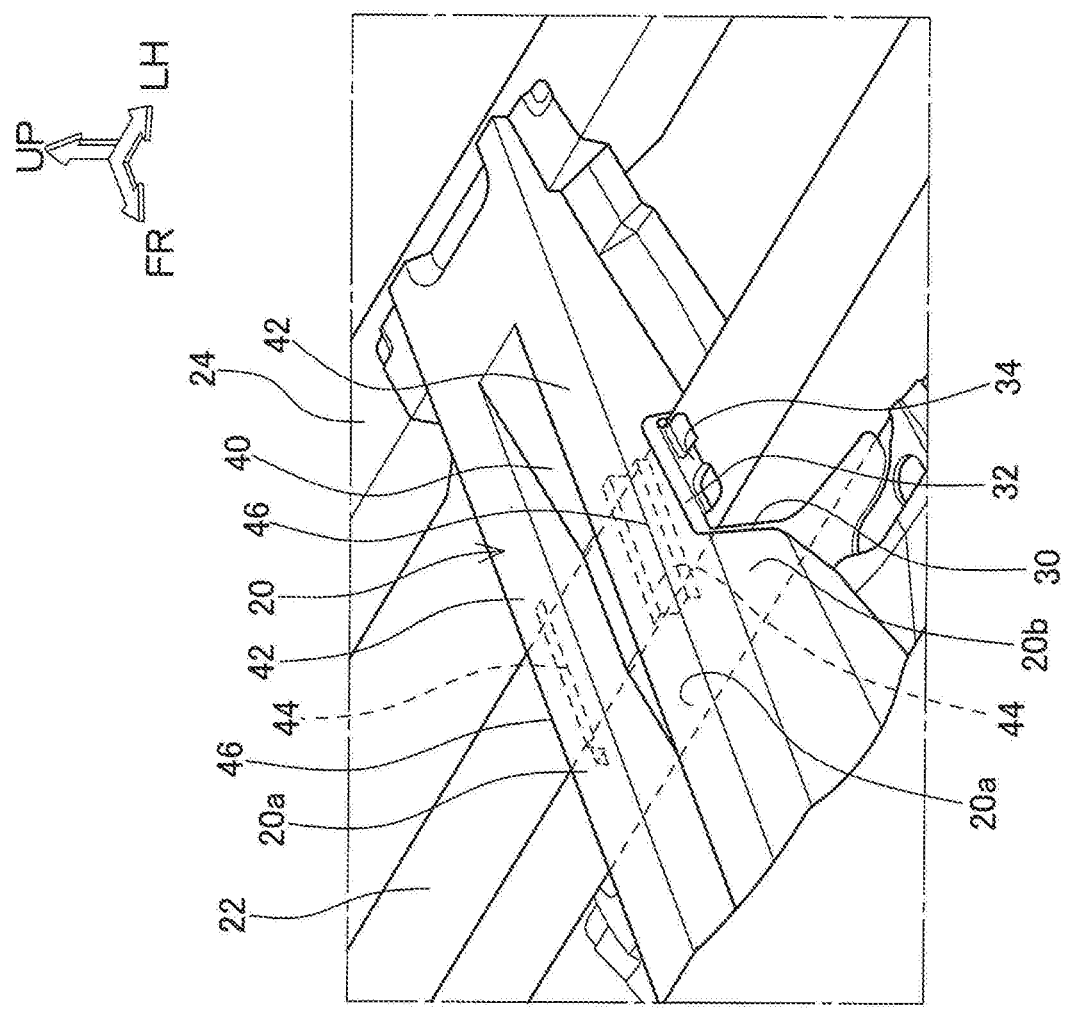
FIG. 2 is an enlarged perspective view of a cross part where a floor center member and a first floor cross member cross each other.
Figure 3:
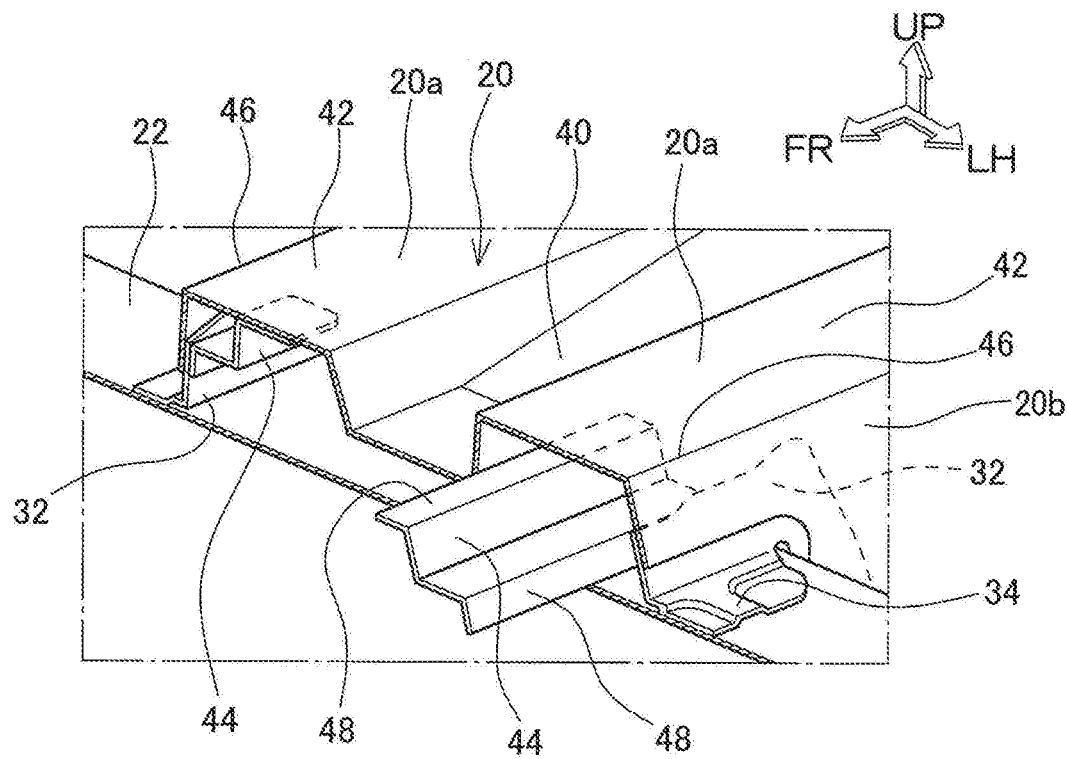
FIG. 3 is a perspective view showing the cross part of FIG. 2 in a partially broken form.
Figure 4:
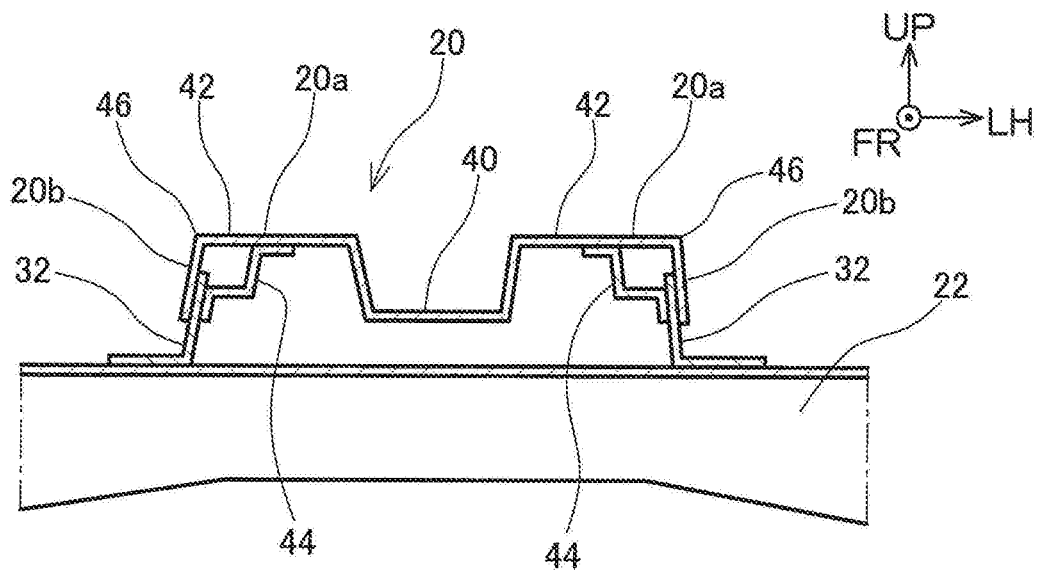
FIG. 4 is a cross sectional view of the cross part of FIG. 2.

FIG. 2 is an enlarged perspective view of a cross part where the floor center member 20 and the first floor cross member 22 cross each other and of a coupled part where the floor center member 20 and the second floor cross member 24 are coupled together. FIG. 3 is a perspective view showing the cross part of the floor center member 20 and the first floor cross member 22 in a partially broken form, and FIG. 4 is a side sectional view of the cross part.

As mentioned above, the first floor cross member 22 penetrates the floor center member 20. On the floor center member 20, a side openings 30 are formed to allow the first floor cross member 22 to pass through the opening. Each side opening 30 is of an inverted U shape. To the periphery of the side opening 30, periphery reinforcing patches 32 are joined by welding or the like to serve as a part of the floor center member 20. On upper marginal parts of the side openings 30 of the floor center member 20, coupling flanges 34, which are counter to a top face of the first floor cross member 22, are respectively formed as a part of the periphery reinforcing patches 32. The coupling flanges 34 are joined to the top face of the first floor cross member 22 by welding or the like.

The first floor cross member 22 penetrates the floor center member 20 at its lower part. When a frontal collision occurs, a collision load transmitted through the floor center member 20 is borne at its lower part by the first floor cross member 22 penetrating the floor center member 20. At this time, however, the upper part of the floor center member 20, which extends across the first floor cross member 22 above it, cannot sufficiently bear the collision load. For this reason, if the collision load is excessively large, the upper part of the floor center member 20 may be bent at the part where it crosses the first floor cross member 22, being deformed into, for example, a Z shape in a side view in some cases. In such a case, the floor center member 20 cannot transmit the collision load in a dispersed form in a wide area of the floor 12. This leads to a heavy deformation of the body floor 12, especially of its front side.

On the top face of the floor center member 20, a groove 40 extending in the longitudinal direction is formed at the center in the lateral direction of the vehicle, and both sides of the groove 40 are formed into ridges 42. The groove 40 and the ridges 42 at least extend from a front end of the floor center member 20; i.e., a part of the floor center member 20 that is joined to the dash panel 28, toward the rear side across the first floor cross member 22. The ridges 42 lie respectively on left and right side edges of the floor center member 20. An irregular shape formed by the groove 40 and the ridges 42 carries more ridge lines, thus enhancing the strength of the floor center member 20. Because of the irregular shape formed on the top face of the floor center member 20, the strength of the floor center member 20 is enhanced without increasing its height.

In this underbody structure 10, to reinforce the top of the floor center member 20, reinforcing members 44 are provided on the interior the floor center member 20, especially, on the interior of the ridges 42, where the reinforcing members 44 are joined to an inner wall surface of the floor center member 20. Each of the reinforcing members 44 may be made of sheet metal. The reinforcing members 44 are located above the first floor cross member 22 and extend in the longitudinal direction of the vehicle. The reinforcing members 44 are provided in such a way as to correspond respectively to ridge lines 46 on the top of the floor center member 20, and the ridge lines 46 extending in the longitudinal direction of the vehicle. Specifically, the reinforcing members 44 may be located in such, a way as to correspond respectively to the ridge lines 46 on left and right edges of the top face of the floor center member 20. Each reinforcing member 44 is joined to two walls (the top wall 20a and the side wall 20b) jointly forming the ridge line 46 to which the reinforcing member 44 corresponds, and, in combination with these two walls 20a and 20b, form a closed section. When the reinforcing member 44 is substantially L-shaped, as shown in FIG. 4, the closed section formed by the reinforcing member 44 and the top wall 20a and side wall 20b is quadrangle. When the reinforcing member 44 is flat-shaped, the closed section is triangular. The reinforcing member 44 has reinforcing member flanges 48 formed respectively on its edges extending in the longitudinal direction of the vehicle. The reinforcing member flanges 48 are joined to the walls 20a and 20b of the floor center member 20 by welding or the like. The reinforcing member flanges 48 may be fastened to the walls 20a and 20b by bolts and nuts, or riveted down to the walls 20a and 20b.

The floor center member 20 reaches the second floor cross member 24, where a rear end of the floor center member 20 is joined to the second, floor cross member 24 by welding or the like. A collision load created by a frontal collision is transmitted to the second floor cross member 24 via the upper part of the floor center member 20. As a result, the collision load is borne dispersedly in a wider area of the floor 12.

The top face of the floor center member may have no irregular shape formed of the groove and ridges and may be formed into a flat shape. The reinforcing member may be disposed on the exterior of the floor center member and joined to an outer wall surface of the floor center member. The reinforcing member is not limited to one made of sheet metal, and may be made of a casting or extrusion of an aluminum alloy and the like.

REFERENCE SIGNS LIST 10 underbody structure
12 body floor
14 floor panel
16, 18 rocker
20 floor center member 22 first floor cross member
24 second floor cross member
28 dash panel
30 side opening
32 periphery reinforcing patch
34 coupling flange
40 groove
42 ridge
44 reinforcing member
46 ridge line
48 reinforcing member flange

The invention claimed is:

1. An underbody structure of a vehicle, comprising:
a floor center member disposed on a body floor of the vehicle, the floor center member extending through a central part of the body floor and along a longitudinal direction of the vehicle;
a first floor cross member disposed on the body floor of the vehicle, the first floor cross member penetrating the floor center member to extend in a lateral direction of the vehicle; and
a reinforcing member located above the first floor cross member and having a length extending in the longitudinal direction of the vehicle, the reinforcing member being joined to an inner wall surface or an outer wall surface on top of the floor center member, a substantial portion of the length of the reinforcing member overlapping the first floor cross member.

2. The underbody structure of the vehicle according to claim 1, wherein the reinforcing member is joined to two walls jointly forming a ridge line on top of the floor center member, the ridge line extending in a longitudinal direction of the vehicle.

3. The underbody structure of the vehicle according to claim 2, wherein the reinforcing member, in combination with the two walls, forms a closed sectional structure.

4. The underbody structure of the vehicle according to claim 1, wherein on a top face of the floor center member, a ridge is formed along a left marginal part and along a right marginal part, and the reinforcing member is located on an interior of the ridge.

5. The underbody structure of the vehicle according to claim 1, further comprising a second floor cross member disposed on the body floor of the vehicle, the second floor cross member extending in the lateral direction of the vehicle and being located rearward relative to the first floor cross member, wherein a rear end of the floor center member is coupled to the second floor cross member.

* * * * *